United States Patent [19]

Higurashi et al.

[11] Patent Number: 5,014,274
[45] Date of Patent: May 7, 1991

[54] CODE-ERROR CORRECTING DEVICE

[75] Inventors: Seiji Higurashi, Tokyo; Takuya Tsushima, Kamakura, both of Japan

[73] Assignee: Victor Company of Japan, Ltd., Yokohama, Japan

[21] Appl. No.: 334,493

[22] Filed: Apr. 7, 1989

[30] Foreign Application Priority Data

Apr. 8, 1988 [JP] Japan .................................. 63-86868

[51] Int. Cl.$^5$ ..................... H03M 13/00; G06F 11/10
[52] U.S. Cl. .................................. 371/40.1; 371/37.4
[58] Field of Search ............... 371/40.1, 42, 47.1, 371/37.4; 364/717

[56] References Cited

U.S. PATENT DOCUMENTS

| | | | |
|---|---|---|---|
| 3,550,082 | 12/1970 | Tong | 371/42 |
| 3,881,099 | 4/1975 | Ailett et al. | 364/717 |
| 3,978,406 | 8/1976 | Matsumoto et al. | 325/41 |
| 3,988,538 | 10/1976 | Patten | 364/717 |
| 4,723,246 | 2/1988 | Weldon, Jr. | 371/42 |

FOREIGN PATENT DOCUMENTS

0086091 8/1983 European Pat. Off.
0217570 4/1987 European Pat. Off.

Primary Examiner—Jerry Smith
Assistant Examiner—Ly V. Hua
Attorney, Agent, or Firm—Pollock, Vande Sande & Priddy

[57] ABSTRACT

A code-error correcting device which comprises a circuit for generating a pseudo-random or quasi-random function and which computes the EXCLUSIVE OR of digital information and an output of the circuit for generating the pseudo-random function and further supplies the computed value of the EXCLUSIVE OR to a digital modulator as an input thereof and in which an initial value for generating the pseudo-random function by the circuit for generating the pseudo-random function is set to be the address information or data block information related to the address information. Thereby, the receiving system can stably perform synchronous detection and bit synchronization on the basis of these turning points. Further, the capability of detecting address errors can be improved or increased and omission of the address error can be decreased.

7 Claims, 5 Drawing Sheets

ADR:00H

```
                    MSB
0 0 0 0 0 0 0 0 [1 1]
1 0 0 0 0 0 0 0  0 1
1 1 0 0 0 0 0 0  0 0
0 1 1 0 0 0 0 0  0 0
0 0 1 1 0 0 0 0  0 0
0 0 0 1 1 0 0 0  0 0
0 0 0 0 1 1 0 0  0 0
0 0 0 0 0 1 1 0  0 0
———————————————————
1 0 0 0 0 0 1 1  0 0
1 1 0 0 0 0 0 1  1 0
0 1 1 0 0 0 0 0  1 1
1 0 1 1 0 0 0 0  0 1
1 1 0 1 1 0 0 0  0 0
0 1 1 0 1 1 0 0  0 0
0 0 1 1 0 1 1 0  0 0
1 0 0 1 1 0 1 1  0 0
———————————————————
1 1 0 0 1 1 0 1  1 0
0 1 1 0 0 1 1 0  1 1
0 0 1 1 0 0 1 1  0 1
0 0 0 1 1 0 0 1  1 0
0 0 0 0 1 1 0 0  1 1
```

FIG. 5(B)

ADR:0IH

```
                    MSB
1 0 0 0 0 0 0 0 [1 1]
1 1 0 0 0 0 0 0  0 1
1 1 1 0 0 0 0 0  0 0
0 1 1 1 0 0 0 0  0 0
0 0 1 1 1 0 0 0  0 0
0 0 0 1 1 1 0 0  0 0
0 0 0 0 1 1 1 0  0 0
1 0 0 0 0 1 1 1  0 0
———————————————————
1 1 0 0 0 0 1 1  1 0
1 1 1 0 0 0 0 1  1 1
1 1 1 1 0 0 0 0  1 1
1 1 1 1 1 0 0 0  0 1
1 1 1 1 1 1 0 0  0 0
0 1 1 1 1 1 1 0  0 0
1 0 1 1 1 1 1 1  0 0
1 1 0 1 1 1 1 1  1 0
———————————————————
1 1 1 0 1 1 1 1  1 1
0 1 1 1 0 1 1 1  1 1
0 0 1 1 1 0 1 1  1 1
0 0 0 1 1 1 0 1  1 1
1 0 0 0 1 1 1 0  1 1
```

CODE-ERROR CORRECTING DEVICE

BACKGROUND OF THE INVENTION

1. Field of the Invention

This invention generally relates to an apparatus for recording digital information on a recording medium such as a magnetic disk or tape and reproducing the recorded information and more particularly to a code-error correcting device for correcting code-errors in digital signals used in the apparatus for recording digital information on the recording medium and reproducing the recorded information.

2. Description of the Related Art

Figure 8:
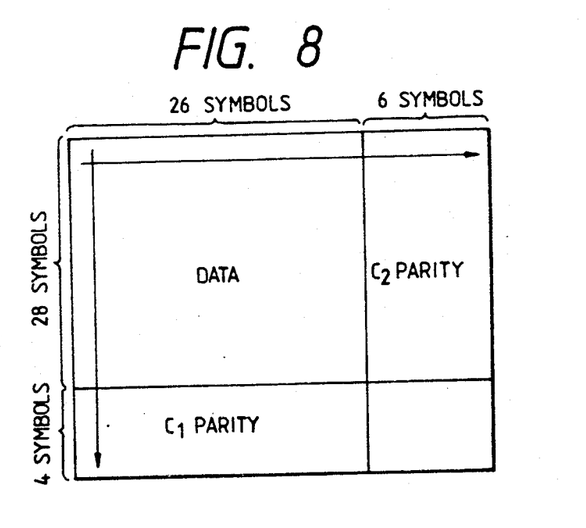
FIG. 8 is a diagram for showing the structure of a code of digital signals used in a typical apparatus for recording audio signals on a recording medium and reproducing the recorded information therefrom.

Referring first to FIG. 8, there is shown the structure of a code of digital signals used in a typical apparatus for recording audio signals on a magnetic tape by means of a rotary head and reproducing the recorded information (that is, what is called an R-DAT (Digital Audio Tape recorder)) therefrom. As shown in this figure, the code includes data (DATA) composed of $28 \times 26$ symbols, a transverse or horizontal parity code ($C_2$ PARITY) composed of $28 \times 6$ symbols and a longitudinal or vertical parity code ($C_1$ PARITY) composed of $4 \times 32$ symbols. In the case of Reed Solomon Code (R.S.C), sets of data concerning the parity codes $C_1$ and $C_2$ are (32, 28, 5) and (32, 26, 7), respectively. In each of the parentheses, a first, second and third numeral indicates values of the total length of a code, the length of data and a minimum distance between code words, respectively.

Figure 9:
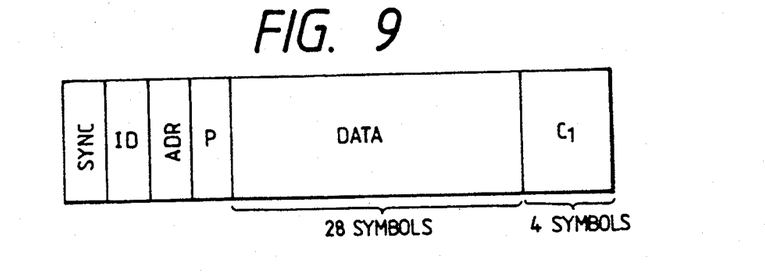
FIG. 9 is a diagram for showing the format employed to record the digital signals of FIG. 8.

Further, referring now to FIG. 9, there is shown the format of signals employed when recording the signals having such structure of codes. In this figure, reference characters SYNC indicates a synchronizing signal; ID an identification signal; ADR an address signal; P a block parity signal; DATA data of 28 symbols; and $C_1$ a $C_1$ parity code of 4 symbols. That is, signals SYNC, ID, ADR and P are added to data signals. Incidentally, in this case, the block parity signal is given by $$P = ID \oplus ADR.$$

Namely, the signals, of which the format is as shown in FIG. 9, are recorded on the magnetic tape and reproduced therefrom.

The above described conventional apparatus can detect address errors to some extent by transmitting the block parity signal indicating $ID \oplus ADR$ together with the signal indicating data DATA. However, the conventional apparatus has a drawback that the capability of detecting the address errors is not sufficient to precisely detect the address error and as a consequence the address errors increase. In this case, data are stored in an erroneous area within a memory in accordance with the erroneous address information because the address information generally determines an area in the memory in which data are to be stored. Conventionally, even when the error cannot be detected by using the longitudinal parity code ($C_1$), the error can still be corrected if the error is present within the range which can be corrected by using the transverse parity code ($C_2$). Further, if the error exceeds the capability of detecting the error by using the transverse parity code ($C_2$), it is necessary to locate the error on the basis of the error information which is generated after the check by using the parity codes $C_1$ and $C_2$.

In such case, if only the area in the memory is erroneous and the parity code $C_1$ is correct, there is the inconvenience that in spite of the fact that a sequence of data is erroneous, the error cannot be detected. Thus, to eliminate such inconvenience, it has been proposed that when the parity code $C_1$ is generated, the address is included as a generating element for the parity code $C_1$. Such approach has a defect that the capability of correcting error is degraded because the code is not a product code.

Therefore, it is an object of the present invention to provide a code correcting device of which the capability of correcting error is significantly improved, thereby decreasing the possibility of passing over the error.

SUMMARY OF THE INVENTION

To achieve the foregoing object and in accordance with a first aspect of the present invention, there is provided a code-error correcting device which comprises a circuit for generating a pseudo-random or quasi-random function and which computes the EXCLUSIVE OR of digital information and an output of the circuit for generating the pseudo-random function and further supplies the computed value of the EXCLUSIVE OR to a digital modulator as an input thereof and in which an initial value for generating the pseudo-random function by the circuit for generating the pseudo-random function is the address information or data block information related to the address information.

Further, in accordance with a second aspect of the present invention, there is provided a code-error correcting device which comprises a circuit for generating the pseudo-random function and being adapted to calculate the EXCLUSIVE OR of the digital demodulation information and an output of the pseudo-random function generating circuit and further supply the value of the EXCLUSIVE OR to a circuit for deriving the original digital information therefrom, wherein an initial value for generating the pseudo-random function by the pseudo-random function generating circuit is the demodulation address information or demodulation data block information related to the modulation address information.

Namely, the code-error correcting device of the present invention scrambles transmission data by computing the EXCLUSIVE OR of the digital information and the output of the pseudo-random function. Thereby, original digital signals are modified in such a manner to include an inversion or transition between 0 and 1 even if the original digital signals indicate a quantity of which every digit is 0 or of which every digit is 1, that is, the original digital signal indicates a quantity including no inversion. In other words, the original signals are changed and become those including many "turning points". (Hereunder, an instant or moment, at which an inversion or a transition between 0 and 1 occurs in a signal, will be referred to as a "turning point".) Thus, the receiving system can stably perform synchronous detection and bit synchronization on the basis of these turning points.

Further, the code-error correcting device of the present invention can effect scramble or de-scramble in accordance with address information. Thus, if an address error occurs, the initial value for generating the pseudo-random function in the pseudo-random function generating device of a reproducing system is different from an appropriate value and moreover a sequence of output signals is different from a sequence of signals in a recording system so that the scramble cannot be interrupted and an error occurs in the parity code. Further, the occurrence of an address error causes an error in decoded data even though there occurs no error in the system for receiving data and further an error appears in a syndrome system. Thereby, the code-error correcting device of the present invention can prevent outputting of erroneous data.

As above stated, in the device of the present invention, transmission data are scrambled and thus an original digital signal is modified to include inversions even if it originally includes no inversion. Thus, in the reproduction system, the synchronizing detection and the bit synchronization can be stably performed on the basis of the turning points. Further, the scramble and the de-scramble are effected in accordance with the address information. Thus, if errors occur in addresses, the initial value of the pseudo-random function generator of the reproduction system is different from that of the pseudo-random function generator of the recording system. Therefore, the scramble cannot be released and an error occurs in the parity codes. Thus, when an address error occurs, there also occurs an error in decoding data even if no errors occur in the data receiving system so that series of syndromes indicate the occurrence of an error. Thereby, the capability of detecting address errors can be improved or increased and omission of the address error can be decreased. Thus, in case of a VTR provided with a PCM speech processing unit, it can prevent the occurrence of an accident of breakage of a speaker due to outputs of erroneous data. Furthermore, a signal de-scrambled in the decoding system is a product code, the capability of detecting and correcting errors in codes can be increased in comparison with the conventional apparatus in which the series of the $C_1$ parity codes includes an address.

BRIEF DESCRIPTION OF THE DRAWINGS

Other features, objects and advantages of the present invention will become apparent from the following description of a preferred embodiment with reference to the drawings in which like reference characters designate like or corresponding parts throughout several views, and in which.

DETAILED DESCRIPTION OF PREFERRED EMBODIMENT

Figure 2:
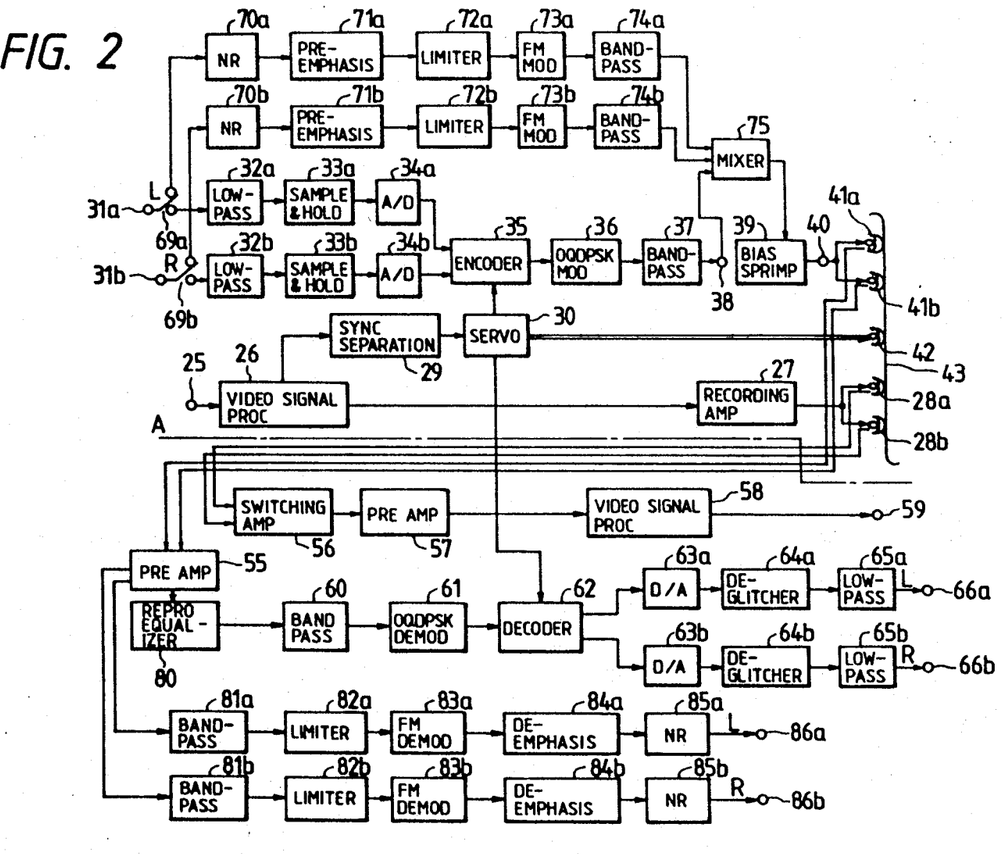
FIG. 2 is a block diagram of a VTR provided with a PCM speech unit to which the device of the present invention is applied.

Turning now to FIG. 2, there is shown a PCM speech signal VTR in which a code-error correcting device embodying the present invention is applied to an encoder and a decoder. The block diagram of this figure shows an apparatus proposed by the applicant of the instant application in the Japanese patent application No. 261319/87 entitled "Magnetic Recording Apparatus and Magnetic Recording and Reproducing Apparatus". This apparatus is one of the PCM speech signal VTRs, of which the form of a signal is somewhat different in number of symbols from the R-DAT but is substantially the same as those of FIGS. 8 and 9. Thus, the description of the form of signals is omitted herein. Firs, the outline of the apparatus of this figure will be described hereinbelow.

Figure 3A:
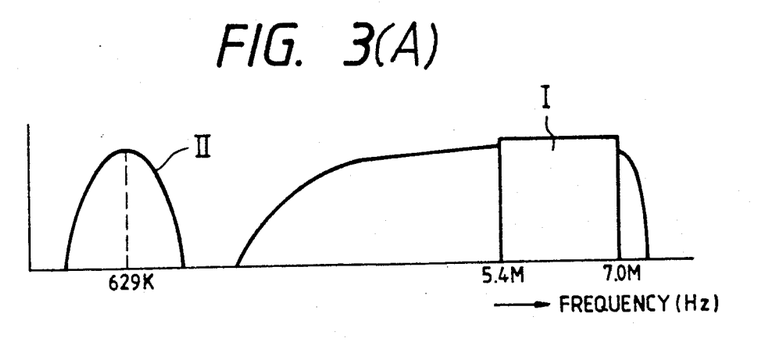
FIGS. 3(A) and 3(B) show a frequency spectrum of parts of the device of FIG. 2.

In this figure, the part shown above a one-dot chain line A is a magnetic recording system. Further, the part shown below the line A is a reproducing system of the apparatus. The magnetic recording system and the reproducing system composes a recording and reproducing apparatus. Color video signals, which are those of the type used in a conventional color television standard system, come to a terminal 25 and are supplied to a video-signal processing circuit 26. This video-signal processing circuit 26 separates a luminance signal from a carrier chrominance signal by using a publicly known means and further generates a frequency-modulated luminance signal (hereunder referred to as an FM luminance signal) by frequency-modulating the carrier by using the luminance signal. Further, the circuit 26 converts the carrier chrominance signal into a low frequency band carrier chrominance signal. Additionally, the circuit 26 modulates both the FM luminance signal and the low frequency band carrier chrominance signal by frequency-division multiplexing and outputs a signal of which the frequency spectrum is as shown in FIG. 3(A). In this figure, reference character I indicates the frequency spectrum of the FM luminance signal of which the deviation range extends from 5.4 MHz to 7.0 MHz. Further, reference character II indicates the frequency spectrum of the low frequency band carrier chrominance signal, of which the carrier frequency is approximately 629 KHz. The video signal for recording an image is supplied to rotary heads 28a and 28b for video signals by way of a recording amplifier 27. The video-signal processing circuit 26 supplies color video signals, which are those of the type used in the color television standard system, to a synchronous separation circuit 29 whereupon a vertical synchronization signal is separated from the color video signals. Further, the circuit 29 feeds the vertical synchronization signal to a servo circuit 30 which will be described hereunder.

Furthermore, a left-channel analog speech signal and a right-channel analog signal respectively coming to terminals 31a and 31b are on one hand sent to a noise reduction (NR) circuit 70a and 70b through switching means 69a and 69b whereupon the dynamic range thereof is reduced to half. Thereafter, pre-emphasis characteristics are given to the speech signals in pre-emphasis circuits 71a and 71b. Moreover, limiters 72a and 72b prevent the magnitude of the signal from exceeding a predetermined level. Outputs of the limiters 72a and 72b are then sent to FM modulators 73a and 73b and are respectively frequency-modulated by the carriers, of which the frequencies are 1.3 MHz and 1.7 MHz, and further sent through band-pass filters 74a and 74b to a mixer 75.

On the other hand, the speech signals are sent by way of switching means 69a and 69b to low-pass filters 32a and 32b whereupon their unnecessary components of frequencies higher than audio frequency are removed therefrom. Thereafter, the speech signals are supplied through sample-and-hold circuits 33a and 33b, of which the sampling frequency is, for example, 47.952 kHz (=48 kHz ÷ 1.001), to A/D converters 34a and 34b, whereupon the speech signals undergo linear quantization of 16 bits. Further, the quantized signals are coded and make PCM speech signals. The respective left-channel and right-channel speech signals are supplied to an encoder 35.

Furthermore, the encoder 35 generates error detecting and correcting codes P and Q in a predetermined format from even-numbered samples ES and odd-numbered samples OS sampled in a period of time (hereunder referred to as a field period) required for the scanning of a field. Moreover, the encoder 35 generates digital speech signals of the signal format including 136 data blocks (corresponding to 43,520 bits) and transmits these signals within the field period which is equal to 1/59.94 seconds. Thus, the bit rate of the digital speech signal is 2.6086 (that is, 136×320×59.94) Mbps.

In addition, the encoder 35 is synchronized with the commencement of scanning of a field, that is, synchronized with the video signal, which is to be recorded, on the basis of outputs of the servo circuit 30.

An Offset Quadrature-phase Differential PSK modulator (OQDPSK modulator) 36 has a publicly known construction comprising a conversion circuit for effecting serial-parallel conversion of the digital speech signals and alternately outputting the converted signals as two strings of signals, a phase-shifting means for shifting the phases of the signals of each string with each other by an amount corresponding to half of a time slot, a balanced modulating means for receiving the strings of the signals as modulation signals and effecting double side band reduced carrier modulation of the individual carriers of which the phases are different from each other by 90° at a predetermined frequency fc and a synthetic circuit for synthesizing the two amplitude-modulated waves received from the balanced modulating means and outputting digital speech signals modulated by the OQDPSK modulator.

The carrier frequency fc is, for instance, selected to be about 3.0 MHz which is 191 times the frequency $f_H$ employed for horizontal scanning. Thus, the frequency spectrum of the digital speech signal outputted by the OQDPSK modulator 36 is a publicly known comb-shaped spectrum, in which the level of the intensity of the signal reaches a maximum at the carrier frequency fc and becomes 0 at the frequency which is apart from the carrier frequency fc by $\pm n \times 1.30$ MHz (=2.6086 MHz /2) because the bit rate is 2.6086 Mbps. Incidentally, n indicates a natural number or positive integer.

Figure 3B:
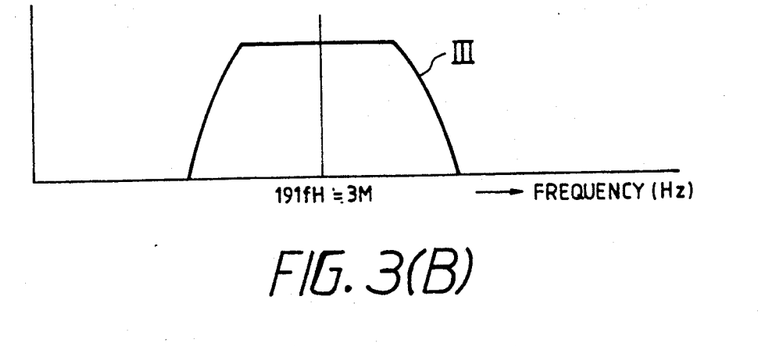

Thus, the digital speech signals outputted by the OQDPSK modulator 36 are subjected to band-limiting to remove the components of unnecessary frequencies therefrom by being passed through the band-pass filter 37 of which the center of the frequency band and the frequency bandwidth are established to be approximately 3.0 MHz which is 0.7 times the bandwidth corresponding to the bit rate such that there occurs no inter-symbol interference. Thereby, the frequency spectrum of the speech signal passed through the filter 37 is obtained as indicated by the character III in FIG. 3 (B).

Thereafter, the band-limited speech signal is inputted to the mixer 75 by way of a terminal 38 to be frequency-division multiplexed with the FM modulated speech signal above described. Then, the band-limited speech signal is supplied to a bias-signal-superimposing circuit 39 whereupon a high frequency bias signal is superimposed on the band-limited speech signal. That is, the bias-signal superimposing circuit 39 superimposes a high frequency signal of, for example, 10.8 MHz fed from a built-in bias-signal oscillator on the OQDPSK-modulated digital speech signal and the frequency-modulated (FM) speech signal. Furthermore, the circuit 39 outputs the thus superimposed signal through a recording amplifier 47 to a terminal 40.

Further, the superimposed signal outputted from the terminal 40 is supplied to each of rotary heads 41a and 41b for speech signals which are shown in FIG. 2. The rotary heads 41a and 41b are mounted in such a manner that each of the heads 41a and 41b faces a different half portion of the periphery of a rotary cylinder (not shown), that is, corresponds to half rotation (namely, a 180-degree rotation) of the cylinder and that the heads 41a and 41b respectively precede the positions, to which the corresponding rotary heads 28a and 28b for video signals are placed, by a constant angle. Further, an azimuth angle of one of the rotary heads 41a and 41b for speech signals is selected to be +30 degrees and an azimuth angle of the other of the rotary heads 41a and 41b is selected to be -30 degrees. Moreover, an azimuth angle of one of the rotary heads 28a and 28b is selected to be +6 degrees and an azimuth angle of the other of the rotary heads 28a and 28b is selected to be -6 degrees.

A motor (not shown) for rotating the rotary cylinder rotates in synchronization with the phase of the vertical synchronization signal on the basis of the output signal of the servo circuit 30 to which the vertical synchronization signal is fed from the synchronization signal separating circuit 29.

Thereby, the digital speech signal and the FM speech signal are recorded by the rotary heads 41a and 41b for speech signals by the high-frequency-bias-signal recording in a deep portion of a magnetic layer of the magnetic tape 43 of which part corresponding to the range of angle of a little over 180 degrees being wound around the rotary cylinder to form a sound track for recording speech signals thereon. Thereafter, video signals to be recorded are then recorded by the rotary heads 28a and 28b for recording on portion near to the surface of the magnetic layer on the sound track to form an image track.

Further, simultaneously with this, a control head 42 records control pulses derived from the vertical synchronization signal by and outputted from the servo circuit 30 by forming a control track along the longitudinal direction of the magnetic tape.

Next, an operation of the reproducing system for reproducing the information recorded on the magnetic tape 43 by the recording system will be described herinbelow. The modulated digital speech signal and the FM speech signal alternately reproduced from the sound track formed in the deep portion of the magnetic layer of the recorded magnetic tape 43 by the rotary heads 41a and 41b are supplied to a pre-amplifier 55. Further, at the same time, the video signals alternately reproduced by the rotary heads 28a and 28b from the image track formed on the magnetic tape 43 are supplied to a switching amplifier 56. Furthermore, the control pulses reproduced by the control head 42 from the control track formed on the magnetic tape 43 are supplied to the servo circuit 30 which controls the rotation of the rotary cylinder such that the reproduced control pulses can be synchronized with reference frequency signals.

Moreover, the switching amplifier 56 amplifies and switches the video signals reproduced by the respective rotary heads 28a and 28b to generate a continuous signal which is supplied through a pre-amplifier 57 to a video signal processing circuit 58 which takes the FM luminance signal and the low frequency band carrier chrominance signal out of the reproduced signal by band-separating or band-limiting by use of a publicly known means and further obtains luminance signals by FM-demodulating the FM luminance signal. Further, the video signal processing circuit 58 obtains carrier chrominance signals by frequency-modulation and superimposes the carrier chrominance signal on the luminance signal and outputs the resultant signal as the reproduced color video signals of the color television standard system from a terminal 59.

On the other hand, the pre-amplifier 55 amplifies the reproduced speech signal derived by mixing the digital speech signal with the FM speech signal from the rotary heads 41a and 41b and further switches the reproduced signal to produce a continuous signal which is fed to a reproducing equalizer 80 and band-pass filters 81a and 81b. Outputs of the band-pass filters 81a and 81b are respectively sent through limiters 82a and 82b to FM-demodulators 83a and 83b and are FM-demodulated therein. Moreover, after de-emphasis characteristics are given to de-emphasis circuits 84a and 84b, the dynamic range is restored to the initial value by noise reduction circuits 85a and 85b. The FM-demodulated signals are outputted from terminals 86a and 86b as left-channel and right-channel speech signals, respectively.

Further, the reproducing equalizer 80 reinforces the attenuated high-frequency components of the speech signals and then supplies the reinforced speech signals to a band-pass filter 60. Furthermore, the reproduced and modulated digital speech signal, which is outputted from the filter 60 after band-separation is effected and which has the frequency spectrum of FIG. 3(B), is fed to the OQDPSK demodulator 61 whereupon the thus fed speech signal is subjected to conventional OQDPSK-demodulation to make a speech signal and is further supplied to a decoder 62.

For the purpose of detecting the starting position of reproduction of digital signals of each track, a synchronization signal, of which the phase is in synchronization with the rotation of the rotary cylinder, is supplied from the servo circuit 30 to the decoder 62. By this decoder 62, the error-correction, time-base-correction, time-base-companding, de-interleaving and so forth of the reproduced digital speech signal are effected and samples are combined with each other in the same order as that at the time of A/D conversion. Further, the reproduced digital speech signal is separated into a left-channel digital speech signal and a right-channel digital speech signal.

Furthermore, these left-channel and right-channel speech signals are respectively changed by D/A converters into analog signals. Thereafter, noise components of the speech signals generated at the time of the D/A conversion thereof are removed by deglitcher circuits 64a and 64b. Further removal occurs for unnecessary speech signal coponents having frequencies higher than those of the signals included within an audio-frequency-band. Thereby, the left-channel analog speech signal and the right-channel analog speech signal are outputted to terminals 66a and 66b, respectively. The apparatus of FIG. 2 mixes the digital speech signal, which is modulated by a polyphase differential PSK modulation process or an offset polyphase differential PSK modulation process, with the FM speech signal. Further, the mixed speech signals and the high frequency bias signal are recorded in a deep portion of the magnetic layer. Thus, the spectrum of noise generated within the low frequency carrier chrominance signal band in the reproduced signal due to the cross modulation distortion originated from nonlinearity of magnetic characteristics of the magnetic tape can be significantly decreased. Therefore, the value of a color video signal to noise ratio (S/N) at the time of reproduction can be improved or increased. Further, an error rate of the reproduced digital speech signal can be improved and the ration S/N of the reproduced FM speech signal can be increased. As is apparent from the foregoing description, the characteristics in the interchangeability of the magnetic tape can be improved. Thus, both the FM speech signal and the digital speech signal can be simultaneously recorded and reproduced. Thereby, the instant invention can resolve an inconvenience that two kinds of recorded tape software should be prepared.

Figure 1A:
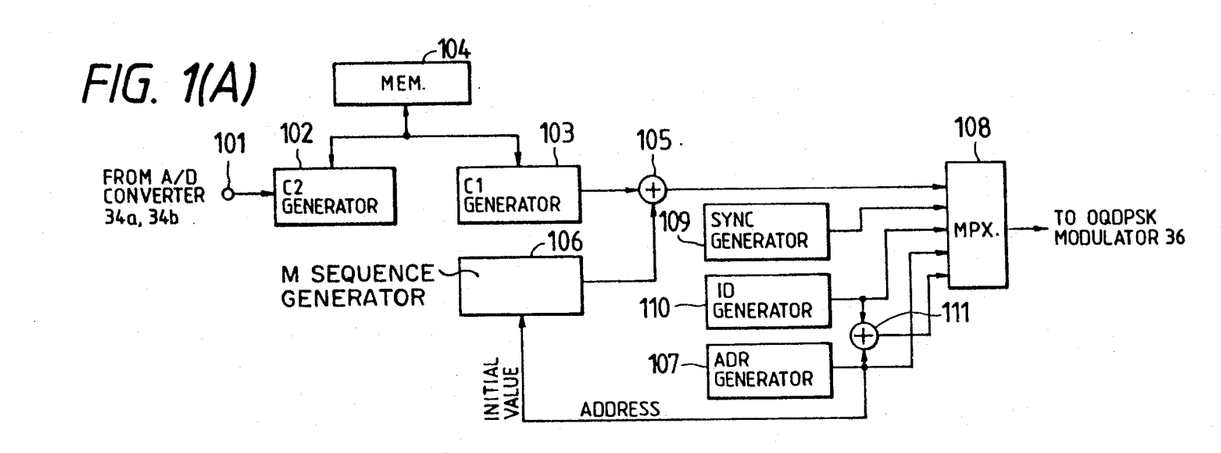
FIGS. 1(A) and 1(B) are block diagrams showing an embodiment of the device of the present invention.
Figure 1B:
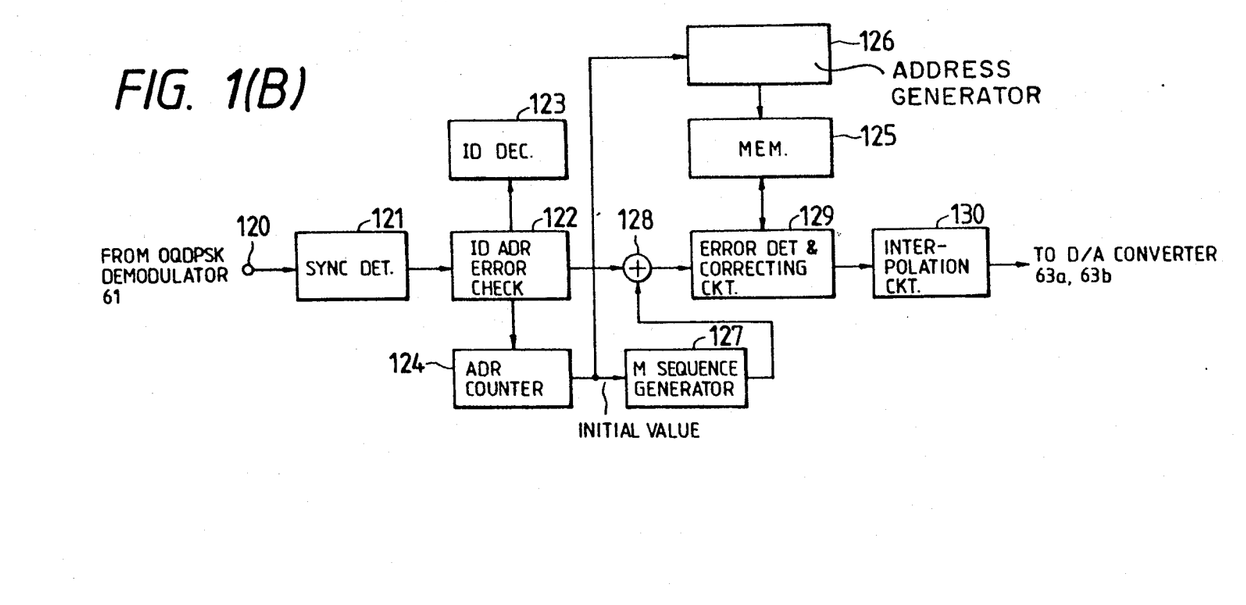

Further, the device of the present invention can be applied to the encoder 35 and the decoder 62 shown in FIG. 2. Referring now to FIGS. 1(A) and (B), there are shown examples of such application of the device of the present invention to an encoder and a decoder. That is, FIG. 1(A) illustrates an example of the application of the device according to the present invention to the encoder. Further, FIG. 1(B) shows an example of the application of the device of the present invention to the decoder.

In the encoder of FIG. 1(A), input digital data from the A/D converters 34a and 34b (see FIG. 2) reach a terminal 101 and are written into a memory 104 after the transverse parity codes $C_2$ are added to the data in a $C_2$ generator 102. When the input data are written into the memory 104, the data including the parity codes $C_2$ are rearranged in accordance with their addresses, that is, are interleaved and then written into the memory 104. The data read out of the memory 104 are supplied to a $C_1$ generator 103, where the parity codes $C_1$ are added. The data interleaved and added with the parity codes $C_2$ and $C_1$ are supplied to an adder 105, whereupon the data from the $C_1$ generator 103 and an output of a pseudo-random function generator 106 for generating maximum period sequence (hereunder referred to simply as M sequence) of scramble signals are EXCLUSIVE ORed.

Figure 4:
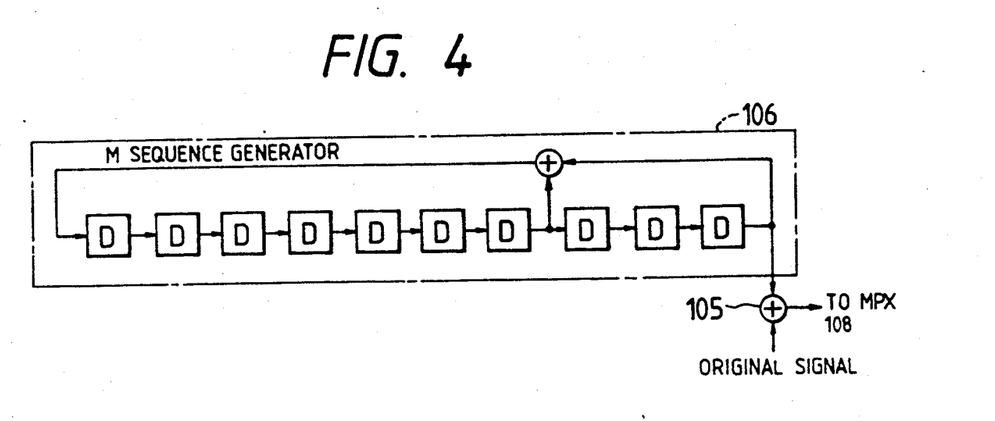
FIG. 4 is a detailed block diagram showing an M sequence generator.
Figure 5A:
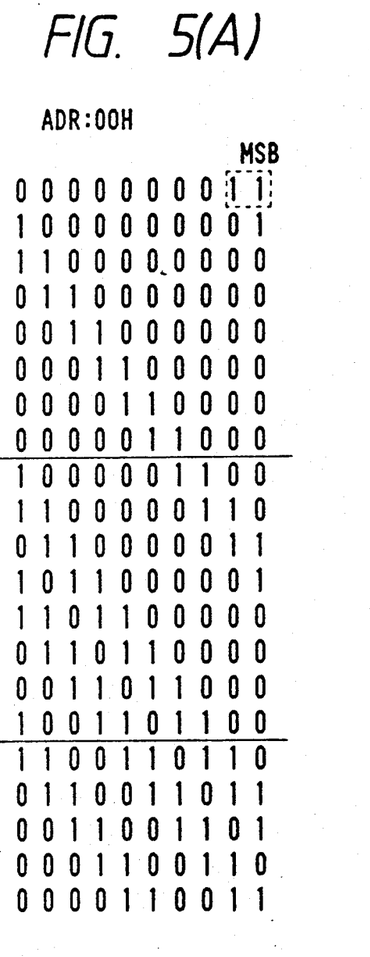
FIGS. 5(A) and 5(B) are diagrams for illustrating the manner of generating a pseudo-random function.
Figure 5B:
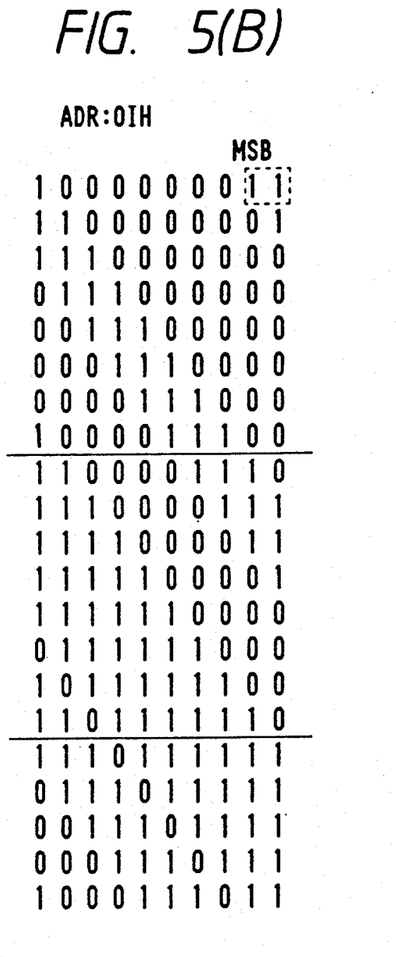
Figure 6A:
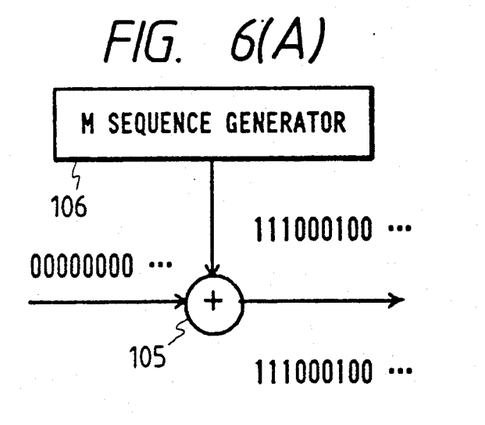
FIGS. 6(A) and 6(B) are diagrams showing the manner of computing EXCLUSIVE OR of an original digital information and the pseudo-random function.

This generator (hereunder referred to simply as M sequence generator) 106 has, for example, what is called a construction of tenth order, that is, is composed of 10 delay circuits Ds as shown in FIG. 4. An initial value indicated by the generator 106 is variously set in accordance with an address (or the value of each data block corresponding to an address) outputted by a block address generator 107. Thus, for instance, as shown in FIGS. 5(A) (corresponding to case of an address $00_H$) and 5(B) (corresponding to case of another address $01_H$, where the suffix $_H$ denotes a number of hexadecimal notation), two high order bits, that is, two bits from the most significant bit (MSB) as indicated by being enclosed by a dashed line are set to be "1". Thereby, the signal patterns of the M sequence in every data block are different from each other. As shown in FIG. 6(A), it is the MSB of the output of the M sequence generator 106 that is used to compute the EXCLUSIVE OR of the original digital signal outputted from the $C_1$ generator 103 and the output of the generator 106 by the adder 105. The original digital signal is scrambled by the M sequence generator 106 and the adder 105 and then taken out therefrom. (Incidentally, in the computation of the EXCLUSIVE OR, the following equations are used:

$0+0=0;$ $1+0=1;$ $0+1=1;$ and $1+1=0.)$

Accordingly, even if all bits indicated by the original digital signal are "0" or all of the bits are "1", in other words, the original digital signal includes no inversion or transition between "0" and "1", the M sequence generator 106 makes the digital signal include inversions. Thus, the digital signal becomes a signal of which turning points frequently appear. Further, in the reproduction system which will be described hereafter, the synchronizing detection and the bit synchronization can be stably performed on the basis of the turning points.

In a multiplexer 108, a synchronization signal from the synchronization signal generator 109, an identifying signal from an ID generator 110, an address signal from an address generator 107 and a signal indicating $P=ID \oplus ADR$ from an adder 111 are added to an output of the adder 105. Thereafter, the output of the adder 105 is supplied to the OQDPSK-modulator 36 shown in FIG. 2.

Next, in the decoder of FIG. 1(B), output data of the OQDPSK-demodulator 61 shown in FIG. 2, which data reach a terminal 120, are detected by a synchronizing detector 121. Further, the identification signal ID and the address signal ADR are checked by an ID . ADR error detector 122 whether or not an error is present in the signals. If not detected, the identification signal ID is detected by an ID decoder 123 and the address signal passes through an address counter 124. If an error is detected, the counted value of the address counter 124 is incremented by one. An output of the address counter 124 is supplied to an address generator 126 for generating an address in a memory 125 to determine an area of the memory to which the data are stored.

Figure 6B:
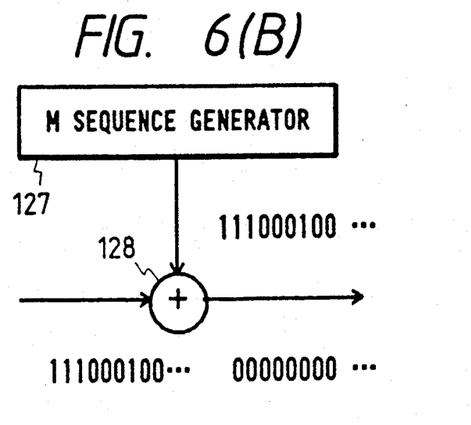

The output of the address counter 124 is supplied to an M sequence generator 127, which is the same with the M sequence generator 106 of FIG. 1(A), and the initial value is established. The output of the M sequence generator 127 and the output of the ID . ADR error detector 122 are EXCLUSIVE ORed by an adder 128 as shown in FIG. 6(B) and the scramble is released to obtain the original digital signal. The outputs of the adder 128 and the memory 125 are subjected to error-correction effected by the error detecting and correcting circuit 129 and further are de-interleaved. Further, outputs of the error detecting and correcting circuit 129, that is, the corrected outputs of the adder 128 and the memory 125 are interpolated by an interpolating circuit 130 and then are supplied to the D/A converters 63a and 63b shown in FIG. 2.

Figure 7:
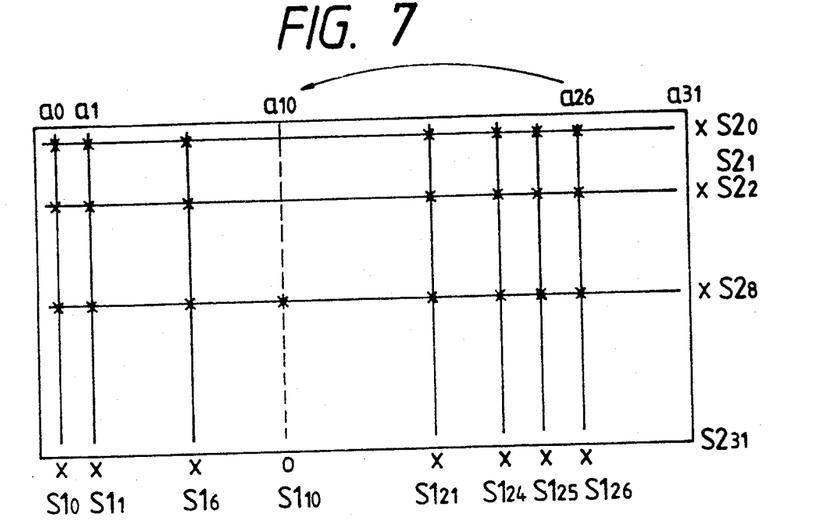
FIG. 7 is a diagram showing the form of syndromes when an address error occurs.

Here, the form of the code is the errors exceeding the capability of error-correcting of the device occur is shown in FIG. 7. The form of the code shown in FIG. 7 is the same as that of FIG. 8. For example, syndromes $S1_0$, $S1_1$, $S1_6$, $S1_{21}$, $S1_{24}$, $S1_{25}$, $S1_{26}$ and $S2_0$, $S2_1$, $S2_2$ and $S2_8$ indicate that the errors exceeding the capability of error-correcting occur. In this case, only the symbols corresponding to the positions of the intersections represented by crosses or saltires in FIG. 7 can be presumed to be erroneous. Thus, it is enough to effect error-correction and interpolation operation only on these samples.

However, in this case, if the address a26 is taken for the address a10, the address counter 124 sends the erroneous address to the memory address generator 126 and thus the data are stored at the erroneous address of the memory 125. Further, if the data stored at the address a10 themselves are not erroneous, all of the S2 syndromes indicate that error-correction is impossible. Thus, it is established that the symbols included in the syndromes $S1_0$, $S1_1$, $S1_6$, $S1_{21}$, $S1_{24}$, $S1_{25}$, $S1_{26}$ and $S1_{10}$ should be indicated as erroneous, while there are no errors in the sequence of the syndrome $S1_{10}$ (as indicated by white circles in FIG. 7) so that the syndrome $S1_{10}$ indicates no errors. As a result, an accident that a speaker is damaged due to outputs of erroneous data in a VTR with a PCM speech processing unit and so forth.

However, in the device of the present invention, the scramble is effected in the encoder shown in FIG. 1(A) in accordance with the address information and on the other hand the de-scramble is effected in the decoder (see FIG. 1(B)). Thus, if an error in the address signal occurs as shown in FIG. 7, the initial value of the M sequence generator 127 is different from that of the M sequence generator 106 of the encoder system as shown in FIG. 5 and the series of the output signals of the generator 127 are different from those of the encoder system so that the scramble cannot be released and moreover errors occur in the $C_1$ parity code. If an address error is present in the device of the present invention, an error occurs in decoding data even though no errors occur in the data receiving system and accordingly the series of the syndromes indicates occurence of errors. Thereby, outputs of the erroneous data can be prevented. Therefore, in accordance with the present invention, the capability of detecting address errors can be increased and omission of the address error can be decreased. Thus, it can prevent occurence of an accident of breakage of a speaker due to outputs of erroneous data.

While a preferred embodiment of the present invention has been described above, it is to be understood that the present invention is not limited thereto and that the present invention is effectively applied in case that only the $C_1$ parity code is employed as an error-correcting code. Further, the present invention is more effectively applied if only the $C_1$ parity code is decoded in a device employing both of the two parity codes, that is, the $C_1$ parity code and the $C_2$ parity code.

Furthermore, the present invention is effective in correcting errors in the system employing multiple encoded codes (which are not limited to product codes), for example, a triple encoded code and a quadruple encoded code and so on.

Further, it is to be understood that other modifications will be apparent to those skilled in the art without departing from the spirit of the invention. The scope of the present invention, therefore, is to be determined solely by the appended claims.

What is claimed is:

1. A code-error correcting device for use in an apparatus for transmitting digital information as well as address information, said code-error correcting device comprising:

an address generating circuit for generating an address information signal indicating address information or data block information relating to address information;

a pseudo-random-function generating circuit for receiving the address information signal as indicating an initial value for computing pseudo-random functions and responsive to the address information signal for generating pseudo-random functions; and an adder circuit for computing the EXCLUSIVE OR of the digital information and an output of the pseudo-random function generating circuit and further supplying the value of the EXCLUSIVE OR to a digital modulator as an input thereof.

2. A code-error correcting device for use in an apparatus for receiving digital demodulation information to which address information is added, said code-error correcting device comprising:

a demodulation address generating circuit for generating a demodulation address information signal indicating demodulation address information or demodulation data block information relating to demodulation address information;

a pseudo-random-function generating circuit for receiving the demodulation address information signal as indicating an initial value for computing pseudo-random function and responsive to the demodulation information signal for generating pseudo-random function; and an adder circuit for calculating the EXCLUSIVE OR of the digital demodulation information and an output of the pseudo-random function generating circuit and further supplying the value of the EXCLUSIVE OR to a circuit for deriving the original digital information therefrom.

3. The code-error correcting device as set forth in claim 1 or 2, wherein said pseudo-random-function generating circuit is a random number generator composed of 10 delay circuits.

4. The code-error correcting device as set forth in claim 3, wherein the initial value is set such that values at the most significant bit and the second highest significant bit are 1, whereby the output thereof includes a transition between 0 and 1.

5. An apparatus for recording digital information on a recording medium and reproducing the recorded information therefrom, said apparatus having an encoder for generating signals indicating error-detecting-and-correcting code and a decoder for receiving digital demodulation information, to which address information is added, and for effecting error-correction of reproduced digital speech signal, said encoder including a first code-error correcting device and on the other hand said decoder including a second code-error correcting device, said first code-error correcting device comprising:

an address generating circuit for generating an address information signal indicating address information or data block information relating to address information;

a first pseudo-random-function generating circuit for receiving the address information signal as indicating a first initial value for computing pseudo-random functions and responsive to the address information signal for generating and outputting pseudo-random function; and a first adder circuit for computing the EXCLUSIVE OR of the digital information and an output of said first pseudo-random function generating circuit and further supplying the value of the EXCLUSIVE OR to a digital modulator as an input thereof, said second code-error correcting device comprising:

a demodulation address generating circuit for generating a demodulation address information signal indicating demodulation address information or demodulation data block information relating to demodulation address information;

a second pseudo-random-function generating circuit for receiving the demodulation address information signal as indicating a second initial value, which is different from the first initial value, for computing pseudo-random function and responsive to the demodulation information signal for generating and outputting pseudo-random function different from the pseudo-random function outputted by said first pseudo-random-function generating circuit; and a second adder circuit for calculating the EXCLUSIVE OR of the digital demodulation information and an output of the pseudo-random function generating circuit and further supplying the value of the EXCLUSIVE OR to a circuit for deriving the original digital information therefrom, thereby preventing erroneous data from outputting therefrom even if no error occurs in the receiving system thereof.

6. The code-error correcting device as set forth in claim 3, wherein said first and second pseudo-random-function generating circuits are random number generators composed of 10 delay circuits.

7. The code-error correcting device as set forth in claim 6, wherein the initial value is set such that values at the most significant bit and the second highest significant bit are 1, whereby the output thereof includes a transition between 0 and 1.

* * * * *